April 21, 1959 P. KERNAN 2,883,530

AMPLITUDE BAND SELECTION CIRCUIT

Filed Sept. 30, 1954 4 Sheets-Sheet 1

Inventor
PAUL KERNAN

By Killman and Kerst
Attorneys

April 21, 1959 P. KERNAN 2,883,530

AMPLITUDE BAND SELECTION CIRCUIT

Filed Sept. 30, 1954 4 Sheets-Sheet 2

Inventor
PAUL KERNAN

By Hillman and Kerst
Attorneys

April 21, 1959 P. KERNAN 2,883,530
AMPLITUDE BAND SELECTION CIRCUIT
Filed Sept. 30, 1954 4 Sheets-Sheet 3

Inventor
PAUL KERNAN

By Killman and Kerst
Attorneys

AMPLITUDE BAND SELECTION CIRCUIT

Filed Sept. 30, 1954 4 Sheets-Sheet 4

Inventor
PAUL KERNAN
By Killman and Kerst
Attorneys

United States Patent Office 2,883,530

Patented Apr. 21, 1959

2,883,530

AMPLITUDE BAND SELECTION CIRCUIT

Paul Kernan, Baltimore, Md., assignor to Bendix Aviation Corporation, Towson, Md., a corporation of Delaware Application September 30, 1954, Serial No. 459,325

4 Claims. (Cl. 250—27)

The present invention refers to signal amplitude sensitive circuits and in particular, to circuits capable of providing output signals indicative of distinct bands of amplitudes of input signals.

It is often necessary to provide a signal which is a function of a first signal in that it indicates when the amplitudes of the first signal exist between predetermined maximum and minimum levels. In some systems it is necessary to provide a plurality of signals which are functions of an equal plurality of bands of amplitudes of a first signal. The present invention provides means capable of producing these desired signals.

Circuits of this type are useful in systems wherein electrical or electro-mechanical servo loops exist or in systems where an operator desires to control equipment in accordance with the information received from the circuits. Such systems are too numerous and diversified to discuss at the present time, altough the application of the invention to a system for iso-echo contour weather plotting will be discussed.

An object of the present invention is to provide a circuit sensitive to bands of amplitudes of an input signal that is simple in design, operation and construction.

Another object of the present invention is to provide a circuit sensitive to bands of amplitudes of an input signal that requires a minimum of components and space so that it may be easily adapted to aircraft applications.

A further object of the present invention is to provide an amplitude sensitive circuit that consumes relatively little power so that it is adaptable to aircraft or portable uses.

These and other objects are realized in a basic circuit where only that part of the input signal that exceeds a predetermined level is amplified and inverted. The resulting signal is then combined with the original signal to produce a signal which is identical to the input signal until the predetermined level is reached, at which point the amplitude begins to diminish and eventually to increase in the opposite polarity. The latter signal is then subjected to a polarity sensitive means which eliminates the portion of the signal of the opposite polarity. A parallel or series combination of the basic circuit produces a composite circuit which is sensitive to a number of amplitude bands equal to the number of the basic circuits that are used.

Referring to the drawings:

Fig. 1 is a block diagram of the basic circuit;

Figs. 2*a* through 2*d* illustrate the signals at various points in the circuit of Fig. 1;

Figs. 3*a* and 3*b* illustrate the variations in the output signals when several variables of the circuit of Fig. 1 are varied;

Figure 1:
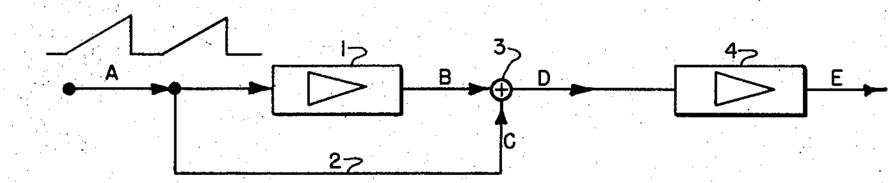
Figure 2A:
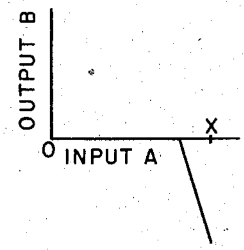
Figure 2D:
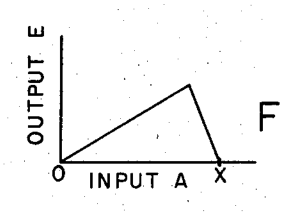
Figure 2B:
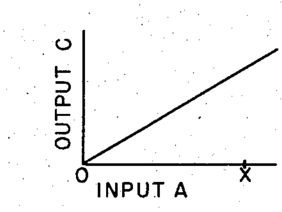
Figure 2C:
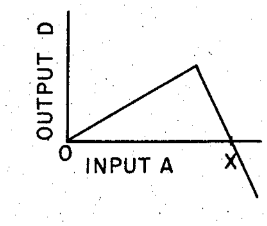

Referring to Fig. 1, a block diagram is shown that illustrates some of the basic fundamentals of the invention. A signal A, shown as a sawtooth waveform for simplicity, is coupled into an amplifier 1. The amplifier 1 is designed to produce an output that is reversed in polarity with respect to the input and to have zero gain until the signal A reaches a predetermined positive polarity level. The amplitude and polarity relationship of the output signal B to the input signal A is illustrated in Fig. 2*a*. A loop 2 around the amplifier 1 is provided so that the unamplified and amplified signals C and B respectively may be added in an adding means 3. The relationship of the unamplified signal C to the signal A is illustrated in Fig. 2*b*. The reversed polarity signal B and the signal C are added to produce a signal D as illustrated in Fig. 2*c*. The signal D is coupled into an amplifier 4 in which only the positive signals are passed. The amplifier 4 is of the cathode follower type. The relationship of the output signal E to the input signal A is illustrated in Fig. 2*d*. Therefore, all input signals A in excess of the amplitude of a point X will not produce any effect in the signal E. The signal E is therefore indicative of values of the signal A between the amplitudes of the points O and X.

Figure 3A:
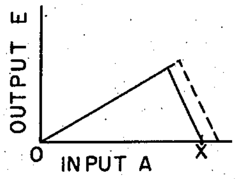
Figure 3B:
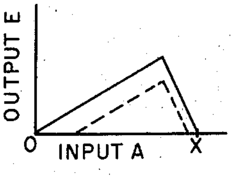

The signal amplitude bandwidth may be changed by varying the operating characteristics in the amplifiers 1 and 4. That is, as the aforementioned predetermined level of amplifier 1 is increased, the point at which the signal output E begins to drop moves to the right, that is, the sensitivity band is widened by producing an output for larger input signals. By varying the operating characteristics of the amplifier 4, the amplitude and bandwidth of the signal E will vary. This is produced by making the amplifier 4 less sensitive so that a larger signal D is necessary to produce the signal E, which will be indicative of a smaller bandwidth as both extremities will move toward thte center. These changes are illustrated by the broken line curves in Figs. 3*a* and 3*b*, respectively.

An indication of a multiplicity of amplitude bandwidths may be accomplished by either of two combinations of a number of the arrangement of Fig. 1. A number of features of each combination will be stated in conjunction with a discussion thereon.

Figures 4, 5, 8:
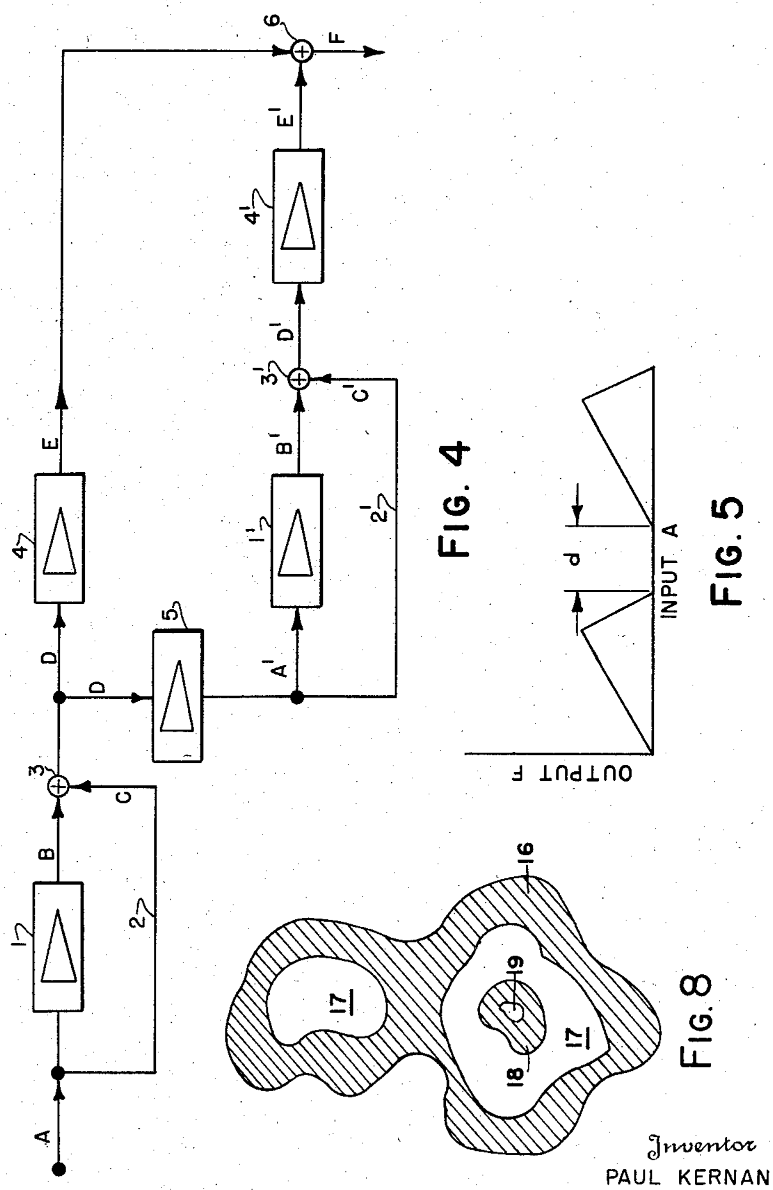
Fig. 4 is a block diagram of a series combination of several of the circuits of Fig. 1.
Fig. 5 illustrates the output signal from the circuit of Fig. 4.
Fig. 8 is a drawing of a possible indication that would be displayed on a cathode ray tube through the use of the invention in a radar system.

Referring to Fig. 4, a block diagram of a system, which will be referred to as the series combination, is illustrated. In this combination, two circuits as illustrated in Fig. 1 are arranged so that the input for the second circuit is obtained via an inverting amplifier 5 which obtains as its input the signal D. Symbols identical to those used in Fig. 1 are used where applicable, with the addition of prime markings to indicate the second circuit. The amplifier 5 produces a signal A′ which is an inversion and amplification of the negative portion of the signal D. With the exception of the amplitudes and the location of the O points, the signal A′ is identical to the input signal A. Consequently, the same process will occur in the second circuit. When the signals E and E′ are added in an adding means 6, a signal F will be produced which will be indicative of two signal amplitude bandwidths. This is illustrated in Fig. 5. Slot *d* may be varied in width by changing the threshold sensitivity of either of the amplifiers 4, 4′ or 5, or combinations thereof. Any variation in the predetermined level of amplifier 1 will produce a change in the amplitude bandwidth indicated by the first indication of Fig. 5 so that the notch *d* and the second indication will move to the left or right but the remaining characteristics thereof will remain unchanged. Varying the predetermined level of amplifier 1' will produce a change in the bandwidth indicated by the second indication by causing the right extremity thereof to move either to the right or left.

Obviously, the indication of a greater number of amplitude bandwidths may be obtained by adding to the circuit of Fig. 4 a number of inverting amplifiers and additional arrangements of Fig. 1 equal to the additional number of bands desired.

Figure 6:
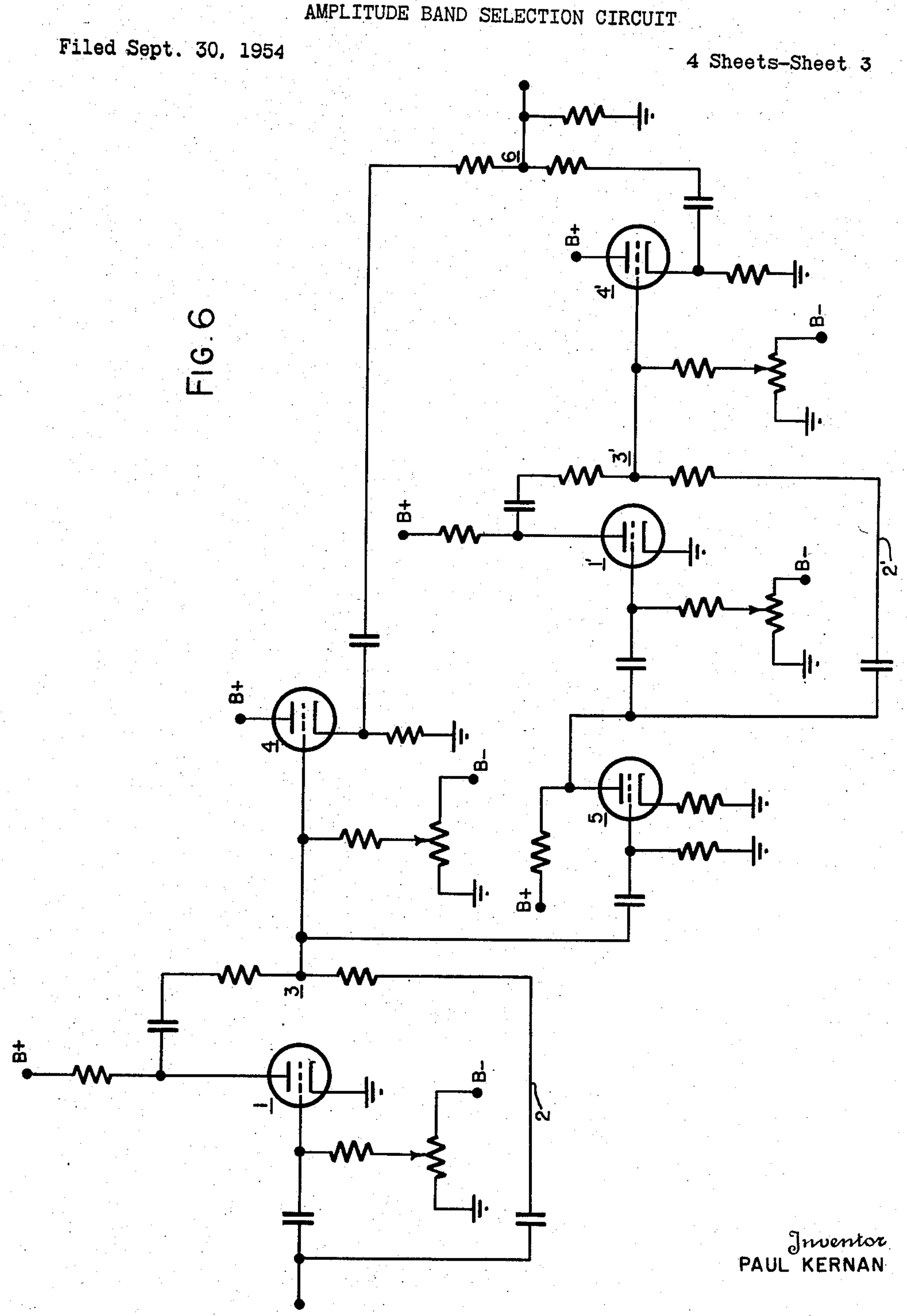
Fig. 6 is a schematic diagram complying with the block diagram of Fig. 4.

Fig. 6 shows a schematic diagram of a circuit conforming to the block diagram of Fig. 4. The same symbols have been used to identify portions of the circuit conforming to the block diagram. As the individual circuits contained therein are conventional and well known in the art, a detailed discussion thereon is deemed unnecessary.

Figure 7:
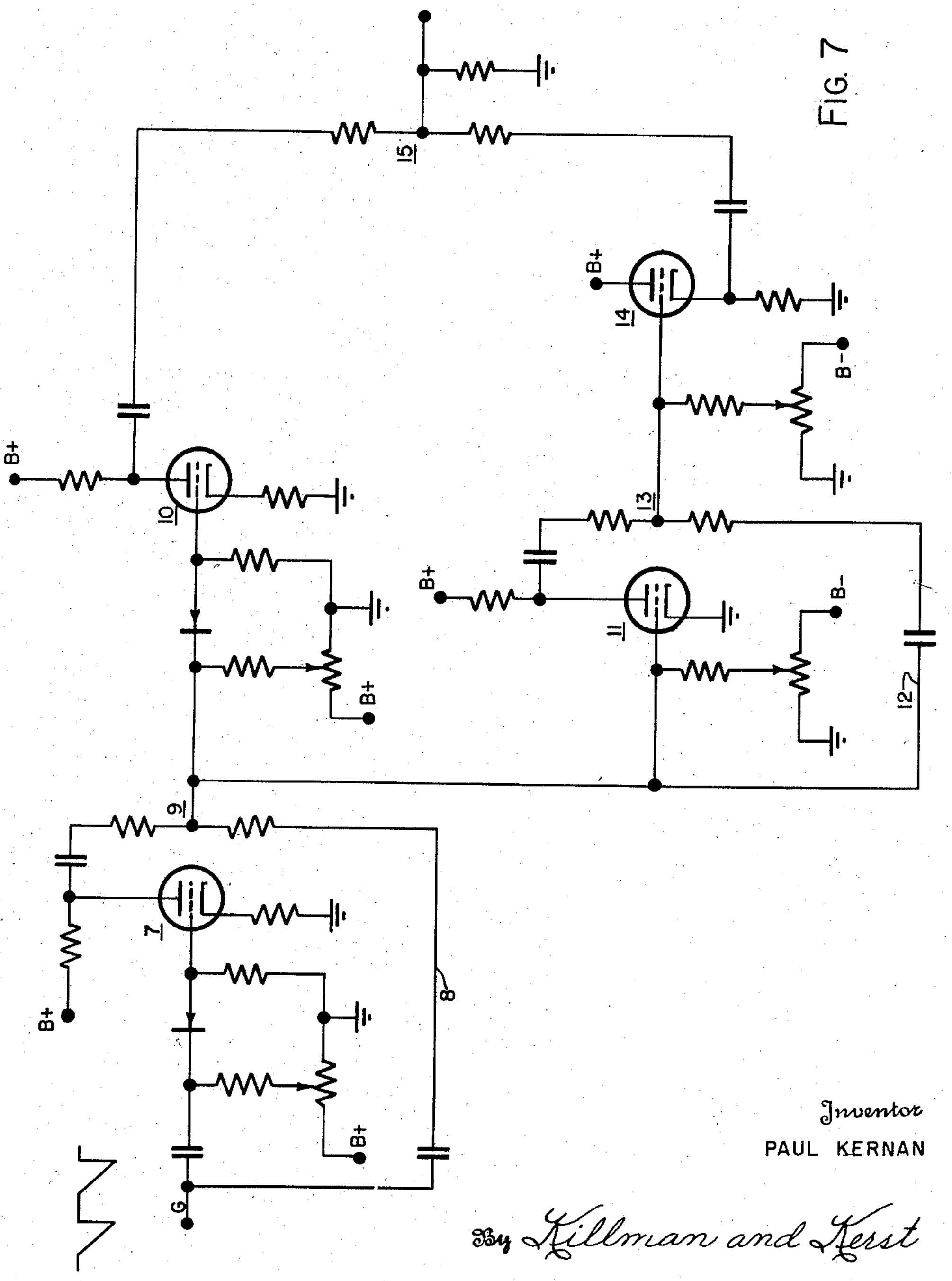
Fig. 7 is a schematic diagram of another series combination capable of handling a negative input signal.

In the foregoing discussion and figures, a positive input signal A was assumed for simplification purposes. If a negative input signal is to be employed, a number of methods obvious to those skilled in the art may be used without deviating from the invention. Such a circuit is shown in Fig. 7. An amplifier 7 responds to the input signal G only when a predetermined negative amplitude is reached. A loop 8 provides an unamplified signal to an adding means 9. The composite signal has a form corresponding to the reciprocal of Fig. 2*c*. An amplifier 10 responds to negative signals only so the output thereof will have the same form as that of Fig. 2*d*. The composite signal obtained from the adding means 9 is also applied to a circuit comprising an amplifier 11, a loop 12, an adding means 13, and an amplifier 14, which are identical in construction and operating characteristics to the amplifier 1, the loop 2, the adding means 3, and the amplifier 4, respectively, of Fig. 6. The output signals of the amplifiers 10 and 14 are then applied to an adding means 15 to produce a composite signal similar to that of Fig. 5.

A particular use of the present invention is the application thereof as a contour circuit in a radar system for producing weather information. A normal radar display indicates echo returns from large masses of moisture that exist in the atmosphere. However, it is almost impossible to distinguish between different moisture densities. When the present invention is applied thereto, the moisture density is discernable by the amplitude sensitivity of the invention to the video signals obtained from the echo signals. Because of this, the pattern produced on the receiving screen will contain contours indicating areas of various moisture densities. This is particularly helpful in aircraft usage as it enables the pilot to avoid areas of heavy rainfall, or if this proves impractical, to evade areas containing large rainfall gradients. Flight tests have demonstrated that heavy gusts of wind and generally bad flying conditions can be expected in areas where a large rainfall gradient exists.

Referring to Fig. 8, a sketch is shown of a part of a possible indication that would be displayed through the use of the present invention in a radar system. An outer contour 16 indicates areas of relatively light rainfall, as the lighter rainfall causes relatively weak echo signals. Contours 17 are produced from the notch 2 and indicate areas of greater rainfall. A contour 18 is produced by the second indication of Fig. 5 and identifies an area of still greater rainfall. The maximum rainfall is indicated in a contour 19 which is produced by the echo signal being sufficiently strong to provide a video signal that exceeds the amplitude necessary to produce the aforementioned second indication. The contours 16 and 18 are shaded to indicate that the illumination intensity of these areas of the viewing tube are different from the remainder of the viewing area.

Although the use of the invention in radar weather plotting has been discussed, the application of the invention to other uses is evident. Therefore, it is to be understood that the invention is not restricted to use in radar weather plotting systems.

What is claimed is:

1. A signal amplitude sensitive circuit comprising: an inverting amplifier; said amplifier responsive to signals of a predetermined polarity and adjustably responsive to amplify only the parts thereof that exceed a predetermined level; means applying input signals to the input of the said amplifier; an adding means having two inputs; means applying the said input signals to one of the said inputs of the said adding means; means applying the output of the said amplifier to the remaining input of the said adding means; means sensitive only to signals of the said predetermined polarity and adjustably responsive to the parts thereof that exceed a predetermined level; means applying the output of the said adding means to the input of the said polarity sensitive means; an inverting means; means applying the said output of the said adding means to the input of the said inverting means; a second inverting amplifier; said second amplifier responsive to signals of the said predetermined polarity and adjustably responsive to amplify only the parts thereof that exceed a predetermined level; means applying the output of the said inverting means to the input of the said second amplifier; a second adding means having two inputs; means applying the said output of the said inverting means to one of the said inputs of the said second adding means; means applying the output of the said second amplifier to the remaining input of the said second adding means; a second means sensitive only to signals of the said predetermined polarity and adjustably responsive to parts thereof that exceed a predetermined level; means applying the output of the said second adding means to the input of the said second polarity sensitive means; a third adding means having two inputs; means applying the output of the said first polarity sensitive means to one of the said inputs of the said third adding means; means applying the output of the said second polarity sensitive means to the remaining input of the said third adding means; and means rendering available the output from the said third adding means.

2. A signal amplitude sensitive circuit comprising: an inverting amplifier; said amplifier responsive to signals of a predetermined polarity and adjustably responsive to amplify only the parts thereof that exceed a predetermined level; means applying input signals to the input of the said amplifier; an adding means having two inputs; means applying the said input signals to one of the said inputs of the said adding means; means applying the output of the said amplifier to the remaining input of the said adding means; means sensitive only to signals of the said predetermined polarity and adjustably responsive to the parts thereof that exceed a predetermined level; means applying the output of the said adding means to the input of the said polarity sensitive means; a second inverting amplifier; said second amplifier responsive to signals of polarity opposite to the said predetermined polarity and adjustably responsive to amplify only the parts thereof that exceed a predetermined level; means applying the output of the said adding means to the input of the said second amplifier; a second adding means having two inputs; means applying the said output of the said second inverting means to one of the said inputs of the said second adding means; means applying the output of the said second amplifier to the remaining input of the said second adding means; a second means sensitive only to signals of polarity opposite to the said predetermined polarity and adjustably responsive to parts thereof that exceed a predetermined level; means applying the output of the said second adding means to the input of the said second polarity sensitive means; a third adding means having two inputs; means applying the output of the said first polarity sensitive means to one of the said inputs of the said third adding means; means applying the output of the said second polarity sensitive means to the remaining input of the said third adding means; and means rendering available the output from the said third adding means.

3. A signal amplitude sensitive circuit comprising: an inverting amplifier; said amplifier responsive to signals of a predetermined polarity and adjustably responsive only to amplify the parts thereof that exceed a predetermined level; means applying input signals to the input of the said amplifier; an adding means having two inputs; means applying the said input signals to one of the said inputs of the said adding means; means applying the output of the said amplifier to the remaining input of the said adding means; means sensitive only to signals of the said predetermined polarity and adjustably responsive to the parts thereof that exceed a predetermined level; means applying the output of the said adding means to the input of the said polarity sensitive means; a plurality of circuits each comprising an inverting means, a second inverting amplifier responsive to signals of the said predetermined polarity and adjustably responsive to amplify only the parts thereof that exceed a predetermined level, means applying the output of the said inverting means to the input of the said second amplifier, a second adding means having two inputs, means applying the said output of the said inverting means to one of the said inputs of the said second adding means, means applying the output of the said second amplifier to the remaining input of the said adding means, a second means sensitive only to signals of the said predetermined polarity and adjustably responsive to the parts thereof that exceed a predetermined level, and means applying the output of the said second adding means to the input of the said second polarity sensitive means; means applying the said output of the first said adding means to the input of the said inverting means of one of the said plurality of circuits; means respectively applying the outputs of each of the said second adding means to the inputs of the remaining of the said inverting means; a third adding means; said third adding means having a plurality of inputs, one greater than the said plurality of circuits; means applying the outputs of the first said sensitive means and the said second sensitive means to the said inputs of the said third adding means; and means rendering available the output of the said third adding means.

4. A signal amplitude sensitive circuit comprising: an inverting amplifier comprising an electron discharge tube having at least an anode, a cathode and a control grid, a load resistor in the anode circuit of said tube, means applying a biasing potential of adjustable magnitude to said tube, and means coupling the output voltage of said tube as it appears across said resistor to a point in said amplitude sensitive circuit; means coupling a signal having a predetermined polarity to said grid and to said point; a first non-inverting amplifier comprising an electron discharge tube, having at least an anode, a cathode and a control grid, adjustable means applying to said tube a biasing potential of sufficient magnitude to render said tube conductive in response to input signals of said predetermined polarity, a load resistor in the cathode circuit of said tube, and means making available the output of said second tube across said load resistor thereof; a second inverting amplifier comprising an electron discharge tube having at least an anode, a cathode and a control grid, a load resistor in the anode circuit of said tube, and means coupling the voltage at said point to said control grid of said tube; a third inverting amplifier comprising an electron discharge tube having at least an anode, a cathode and a control grid, a load resistor in the anode circuit of said tube, means applying a biasing potential of adjustable magnitude to the said control grid thereof and means coupling the output thereof as it appears across said load resistor to a second point in said amplitude sensitive circuit; means coupling the output of said second inverting amplifier as it appears across said load resistor thereof to the control grid of said third inverting amplifier and to said second point, the last mentioned adjustable biasing means being so adjusted that said third inverting amplifier conducts only during the application to said control grid thereof of voltage within an amplitude range differing from that which produces conduction of said first inverting amplifier, a second non-inverting amplifier comprising an electron discharge tube having at least an anode, a cathode and a control grid, a load resistor in the cathode circuit thereof and adjustable means applying to said tube a biasing potential of such magnitude as to render said tube conductive only in response to input signals of said predetermined polarity; means coupling the outputs of said first and second non-inverting amplifiers to a third point in said amplitude sensitive circuit and means making available the voltage appearing at said third point.

References Cited in the file of this patent

UNITED STATES PATENTS

| | | |
|---|---|---|
| Re. 24,084 | Atlas | Nov. 1, 1955 |
| 2,419,548 | Grieg | Apr. 29, 1947 |
| 2,420,374 | Houghton | May 13, 1947 |
| 2,428,913 | Hulst | Oct. 14, 1947 |
| 2,434,921 | Grieg | Jan. 27, 1948 |
| 2,434,922 | Grieg | Jan. 27, 1948 |
| 2,438,910 | Grieg | Apr. 6, 1948 |
| 2,468,059 | Grieg | Apr. 26, 1949 |
| 2,486,106 | Brown | Oct. 25, 1949 |
| 2,537,589 | Johnson | Jan. 9, 1951 |
| 2,577,147 | Oberman et al. | Dec. 4, 1951 |